United States Patent [19]

Masuda et al.

[11] Patent Number: 5,525,675

[45] Date of Patent: Jun. 11, 1996

[54] THERMOPLASTIC ELASTOMER, COMPOSITION THEREFOR AND PRODUCTION PROCESS THEREOF, AS WELL AS MOLDED OR OTHERWISE FORMED PRODUCT OBTAINED FROM THE THERMOPLASTIC ELASTOMER

[75] Inventors: Kazuhiko Masuda, Yokohama; Sachio Yokote, Zushi; Masatoshi Kumagai, Yokohama, all of Japan

[73] Assignee: Mitsui Toatsu Chemicals, Inc., Tokyo, Japan

[21] Appl. No.: 216,464

[22] Filed: Mar. 23, 1994

[30] Foreign Application Priority Data

Mar. 31, 1993 [JP] Japan .................. 5-074227

[51] Int. Cl.$^6$ .................. C08L 23/26; C08K 5/14
[52] U.S. Cl. .................. 525/194; 525/193; 525/240; 296/901; 293/102
[58] Field of Search .................. 525/194, 240, 525/193

[56] References Cited

U.S. PATENT DOCUMENTS

| | | | |
|---|---|---|---|
| 3,806,558 | 4/1974 | Fischer | 525/240 |
| 4,130,535 | 12/1978 | Coran et al. | 525/211 |
| 4,143,099 | 3/1979 | Duncan | 525/194 |
| 4,748,206 | 5/1988 | Nogiwa et al. | 525/240 |
| 5,232,993 | 8/1993 | Winter et al. | 525/247 |
| 5,310,800 | 5/1994 | Shimizu et al. | 525/193 |
| 5,314,956 | 5/1994 | Asanuma et al. | 525/240 |

FOREIGN PATENT DOCUMENTS 0338860  10/1989  European Pat. Off. .

Primary Examiner—Carman J. Seccuro, Jr.
Attorney, Agent, or Firm—Burns, Doane, Swecker & Swecker

[57] ABSTRACT

Described is a thermoplastic elastomer comprising (A) 10–90 wt. % of polypropylene having substantially a syndiotactic structure, and (B) 90–10 wt. % of an ethylene-propylene-nonconjugated diene copolymer rubber and/or ethylene-propylene copolymer rubber, said (B) having been partially crosslinked. The elastomer according to the present invention is useful for obtaining formed products, particularly automotive bumper fascias, automotive mud guards and automotive trim skin material, which are excellent not only in flexibility, rubber elasticity and mechanical strength but also in external appearance and touch, and are substantially free from bleeding and fogging.

9 Claims, No Drawings

THERMOPLASTIC ELASTOMER, COMPOSITION THEREFOR AND PRODUCTION PROCESS THEREOF, AS WELL AS MOLDED OR OTHERWISE FORMED PRODUCT OBTAINED FROM THE THERMOPLASTIC ELASTOMER

BACKGROUND OF THE INVENTION

1. Field of the Invention

This invention relates to a thermoplastic elastomer useful for obtaining a molded or otherwise formed product which is excellent in not only flexibility, rubber elasticity and mechanical strength but also in external appearance and touch and is substantially free from bleeding and fogging; and a production process of the thermoplastic elastomer; such a molded or otherwise formed product; and a composition for the thermoplastic elastomer (hereinafter called "thermoplastic elastomer composition").

2. Description of the Related Art

It is known for many years that a syndiotactic polypropylene can be obtained by conducting polymerization at a low temperature in the presence a catalyst composed of a vanadium compound, an ether and an organoaluminum. The polymer available by this process however has low syndiotacticity so that it can hardly be considered to literally have syndiotactic properties. J. A. Ewen et al. found for the first time that polypropylene having such high tacticity as exceeding 0.7 in terms of syndiotactic pentad fraction can be obtained using a catalyst composed of aluminoxane and a transition metal compound having an asymmetric ligand (J. Amer. Chem. Soc., 110, 6255–6, 1988).

The polymer obtained according to the process of J. A. Ewen et al. had high syndiotacticity and was equipped with more elastic properties than isotactic polypropylene. Its flexibility, rubber elasticity and mechanical strength, however, were not sufficient when one tried to apply it as a soft molding or forming material to fields where soft PVC, vulcanized rubber or the like was employed.

It has been attempted to improve the flexibility and impact resistance of isotactic polypropylene, usually by blending an ethylene-propylene copolymer rubber or the like. The resin compositions thus obtained were excellent in flexibility and impact resistance, but insufficient in rubber elasticity, mechanical strength and external appearance.

With a view toward overcoming the above problems, some processes have been proposed, including a process in which a thermoplastic resin composition is dynamically crosslinked with an organic peroxide [as disclosed in Japanese Patent Publication No. 34210/1978 (corresponding to U.S. Pat. No. 3806558)] and a process in which a thermoplastic resin containing a polymer having unsaturated carbon-carbon bonds such as rubber is dynamically crosslinked with a sulfur-base crosslinking agent [as disclosed in Japanese Patent Publication No. 18448/1970 (corresponding to U.S. Pat. No. 4130535)].

These processes are however accompanied by the drawback that when a soft composition containing particularly a large amount of rubber is treated according to any one of these processes, the flowability of the composition is substantially lowered, resulting not only in deteriorated moldability or formability but also in a molded or otherwise formed product having a rough surface and hence poor external appearance and touch.

SUMMARY OF THE INVENTION

An object of the present invention is to provide a thermoplastic elastomer which is free of the above-described problems and is useful for obtaining a molded or otherwise formed product excellent not only in flexibility, rubber elasticity and mechanical strength but also in external appearance and touch and substantially free of bleeding and fogging; a composition for preparing the thermoplastic elastomer; and such a molded or otherwise formed product.

The present inventors have conducted an extensive investigation with foregoing problems in view. As a result, it has been found that a thermoplastic elastomer having excellent flexibility, rubber elasticity, mechanical strength and external surface appearance can be obtained by dynamically crosslinking a syndiotactic polypropylene and an ethylene-propylene-nonconjugated diene copolymer rubber and/or an ethylene-propylene copolymer rubber in the presence of an organic peroxide and optionally, a crosslinking aid, while melting and kneading the same, leading to the completion of the present invention.

The present invention therefore provides:

(1) a thermoplastic elastomer comprising (A) 10–90 wt. % of a polypropylene having substantially a syndiotactic structure, and (B) 90–10 wt. % of an ethylene-propylene-nonconjugated diene copolymer rubber and/or an ethylene-propylene copolymer rubber, said component (B) having been partially crosslinked, (2) a thermoplastic elastomer composition comprising (A) 10–90 wt. % of a polypropylene having substantially a syndiotactic structure, (B) 90–10 wt. % of an ethylene-propylene-nonconjugated copolymer rubber and/or an ethylene-propylene copolymer rubber, and an organic peroxide, and (3) a process for the preparation of the thermoplastic elastomer (1), which comprises crosslinking the composition (2) while melting and kneading the same.

The present invention will hereinafter be described in detail.

DETAILED DESCRIPTION OF THE PREFERRED EMBODIMENTS

To prepare the composition of the present invention, the syndiotactic polypropylene is used in an amount of 10–90 wt. %, preferably 20–80 wt. %. If the amount of the syndiotactic polypropylene is smaller than 10 wt. %, the resulting thermoplastic elastomer has poor mechanical strength, formability, heat resistance and chemical resistance. If the amount is greater than 90 wt. %, the resulting thermoplastic elastomer has poor flexibility, impact resistance and touch.

The composition of the thermoplastic elastomer of the present invention can be varied depending on its application purpose, specifically the hardness. For example, to produce an automotive bumper faisia having a Shore "D" hardness of 50–90, the syndiotactic polypropylene can amount to 60–90 wt. %, preferably 70–80 wt. %. To produce an automotive mud guard having a Shore "D" hardness of 30–70, the syndiotactic polypropylene can amount to 40–60 wt. %, preferably 45–55 wt. %. For an automotive interior trim skin material having a Shore "A" hardness of 30–100 such as a door lining material, headlining material or panel covering material, the syndiotactic polypropylene can amount to 10–50 wt. %, preferably 20–40 wt. %.

Examples of a catalyst suitable for the production of the syndiotactic polypropylene in the present invention include catalysts composed of a cocatalyst and a bridging transition metal compound having an asymmetric ligand such as those disclosed in U.S. Pat. No. 4,892,851, EP 351,391A, EP 387,690A, U.S. Pat. No. 5,132,381, EP 427,697A, U.S. Pat. No. 5,155,080 and Japanese Patent Laid-Open No. 69394/ 1990. Catalysts even having a different structure can still be used insofar as they make it possible to provide a polypropylene having a syndiotactic pentad fraction of at least 0.7 (as measured in accordance with the method disclosed in U.S. Pat. No. 4,892,851). Slurry polymerization, bulk polymerization and gas phase polymerization can all be employed for polymerization.

In the present invention, any propylene copolymer even that containing a small amount of an olefin such as ethylene, 1-butene, 1-hexene, 1-decene, 1-hexadecene, cyclopentene or norbornene; or a diene such as hexadiene, octadiene, decadiene, dicyclopentadiene or 5-ethylidene-2-norbornene can be used as the syndiotactic polypropylene insofar as it has substantially a syndiotactic structure. Such a copolymer can be obtained by copolymerizing propylene and a small amount of a comonomer in the presence of the above-described known catalyst which makes it possible to provide a poly-$\alpha$-olefin having good syndiotacticity. The comonomer may be added in an amount of 20 wt. % or smaller, preferably 15 wt. % or smaller. In the present invention, a copolymer of propylene and ethylene and/or an $\alpha$-olefin can be used preferably. A copolymer of propylene, ethylene and an $\alpha$-olefin is more preferred.

Syndiotactic polypropylene homopolymer usable in the present invention preferably has a syndiotactic pentad fraction of at least 0.7, notably at least 0.85. The homopolymer having a syndiotactic pentad fraction of at least 0.7 is preferred because of its excellent heat resistance and formability. The syndiotactic pentad fraction of the syndiotactic polypropylene copolymer is preferably at least 0.3, notably at least 0.5. For soft thermoplastic elastomers, copolymers are particularly preferred.

In the present invention, any known ethylene-propylene-nonconjugated diene copolymer rubber and/or ethylene-propylene copolymer rubber can be used. Examples of a diene monomer which can be used for the copolymerization of the ethylene-propylene-nonconjugated diene copolymer rubber include $C_{5-20}$ nonconjugated dienes such as 1,4-hexadiene, 5-methyl-1,5-hexadiene, 1,4-octadiene, cyclohexadiene, cyclooctadiene, dicyclopentadiene, 5-ethylidene-2-norbornene, 5-butylidene-2-norbornene and 2-isopropenyl-5-norbornene. 5-Ethylidene-2-norbornene and dicyclopentadiene are preferred among them. The rubber employed has a Mooney viscosity $ML_{1+4}$ of 5–350 at 100° C., preferably 10–200, more preferably 10–150. When the Mooney viscosity is smaller than 5, the rubber cannot have sufficient mechanical strength. To the contrary, any viscosities greater than 350 lead to a deterioration in flowability and thus to inferior formability.

In the process of the present invention, an ethylene-propylene-nonconjugated copolymer rubber may be preferred to an ethylene-propylene copolymer rubber, because the former is more readily crosslinked than the latter.

In the present invention, an organic peroxide is employed as a crosslinking agent. Any known organic peroxides usable for the crosslinking of unsaturated rubbers such as an ethylene-propylene-nonconjugated diene copolymer rubber or saturated rubbers such as an ethylene-propylene copolymer rubber can be used. Examples of such organic peroxides include dicumyl peroxide, di-t-butyl peroxide, 2,5-dimethyl-2,5-di-(t-butylperoxy)hexane, 2,5-dimethyl-2,5-di-(t-butylperoxy)hexyne- 3,1,3-bis(t-butylperoxyisopropyl)benzene, 1,1-bis(t-butylperoxy)-3,3,5-trimethylcyclohexane, n-butyl- 4,4-bis(t-butylperoxy)valerate, benzoyl peroxide, p-chlorobenzoyl peroxide, 2,4-dichlorobenzoyl peroxide, t-butyl peroxybenzoate, t-butyl perbenzoate, t-butylperoxyisopropyl carbonate, diacetyl peroxide, lauroyl peroxide and t-butylcumyl peroxide. Among them, 2,5 -dimethyl-2,5-di-(t-butylperoxy)hexane, 2,5-dimethyl- 2,5-di(t-butylperoxy)hexyne-3,1,3-bis(t-butylperoxyisopropyl)benzene are preferred. 2,5-Dimethyl-2,5 -di(t-butylperoxy)hexane is particularly preferred.

The organic peroxide can be added in an amount of 0.1–3.0 parts by weight, preferably 0.2–1.0 part by weight per 100 parts by weight of the sum of the syndiotactic polypropylene and ethylene-propylene-nonconjugated diene copolymer rubber and/or ethylene-propylene copolymer rubber. If the amounts of organic peroxide are smaller than 0.1 part by weight, crosslinking of the component (B), that is, the ethylene-propylene-nonconjugated diene copolymer rubber and/or ethylene-propylene copolymer rubber is insufficient, leading to deteriorations in rubbery properties of resulting elastomer, such as strain recovery and impact resilience, and mechanical strength. On the other hand, amounts greater than 3.0 parts by weight cause not only a substantial reduction in the molecular weight of the syndiotactic polypropylene (A), which leads to a deterioration in the mechanical strength of the resulting thermoplastic elastomer, but also excessive crosslinking of the ethylene-propylene-nonconjugated copolymer rubber and/or ethylene-propylene copolymer rubber (B), which leads to a reduction in the flowability of the thermoplastic elastomer. When such a composition is formed into an extruded sheet, in particular, the sheet will have a rough surface and hence inferior external appearance and touch.

Upon partial crosslinking of the component (B) using an organic peroxide according to the present invention, various additives ordinarily employed in crosslinking reactions can be added. It is particularly preferred to add a crosslinking aid. Examples of the crosslinking aid include bismaleimides such as N,N'-m-phenylenebismaleimide and trimethylolpropane-N,N'-m-phenylenedimaleimide; quinone dioximes such as p-quinone dioxime and p,p'-dibenzoylquinone dioxime; diphenylguanidine; and multifunctional vinyl monomers such as divinylbenzene, triallyl isocyanurate, ethylene glycol dimethacrylate, trimethylolpropane trimethacrylate and allyl methacrylate. It is desired to add such a crosslinking aid in an amount equal to or twice as much as that of the organic peroxide. When the amount of the crosslinking aid falls within the above range, the crosslinking reaction does not proceed too much and the resulting thermoplastic elastomer can retain flowability, leading to excellent formability. Further, the resulting thermoplastic elastomer is free of unreacted crosslinking aid. Amounts within the above range are therefore preferred. The addition of the crosslinking aid is desired as the resin composition can be imparted with improved rubber elasticity and mechanical strength.

In the present invention, the component (B), that is, the ethylene-propylene-nonconjugated diene copolymer rubber and/or the ethylene-propylene copolymer rubber, has been partially crosslinked. This means that the amount of a residue still remaining after the thermoplastic elastomer of the present invention has been boiled for at least 4 hours in boiling xylene and then filtered through a 400-mesh metal sieve at 125° C. is about 10–95 parts by weight, preferably about 30–95 parts by weight per 100 parts by weight of the component (B) added.

The thermoplastic elastomer according to the present invention has excellent flowability so that addition of processing oil or the like is not required usually. The composition, however, can contain one or more of various softeners including processing oil in order to impart improved flexibility and/or rubber elasticity to the thermoplastic elastomer. The softener can be added to the ethylene-propylene-nonconjugated diene copolymer rubber and/or ethylene-propylene copolymer rubber (B) in advance; or can be added upon mixing the syndiotactic polypropylene (A) and the ethylene-propylene-nonconjugated copolymer rubber and/or the ethylene-propylene copolymer rubber (B) or upon melting and kneading the components (A) and (B). Either method can be employed. No particular limitation is imposed on the amount of the softener. If it is added in a large amount, however, the resulting thermoplastic elastomer has substantially deteriorated mechanical strength and when the composition is formed into a product, the softener comes up to the surface of the formed product, thereby making the surface sticky and poor in touch and also causing fogging. It is therefore not preferred to add the softener in a large amount. In general, the softener can be added in an amount of not greater than 200 parts by weight, preferably not greater than 150 parts by weight per 100 parts by weight of the ethylene-propylene-nonconjugated diene copolymer rubber and/or the ethylene-propylene copolymer rubber.

In addition to the essential components, that is, the syndiotactic polypropylene and the ethylene-propylene-nonconjugated diene copolymer rubber and/or ethylene-propylene copolymer rubber, the composition of the present invention can contain one or more other resins or rubbers to an extent not impairing its properties such as flexibility, mechanical strength, formability, heat resistance and chemical resistance and also the external appearance and touch of the formed product. Examples of such resins and rubbers include isotactic polypropylene, ethylene-butene rubber, propylene-butene rubber, hydrogenated styrene-butadiene diblock copolymer, hydrogenated styrene-butadiene-styrene triblock copolymer, hydrogenated styrene-isoprene diblock copolymer, hydrogenated styrene-isoprene-styrene triblock copolymer, low-density polyethylene, high-density polyethylene, linear low-density polyethylene, ultra-low-density polyethylene, ethylene-ethylacrylate copolymers, ethylene-vinyl acetate copolymer and polybutene. These resins and/or rubbers may ordinarily be added in a total amount of not more than 50 wt. %, preferably 1–50 wt. %, based on the whole composition. Furthermore, a filler can be added to the composition to an extent not impairing the flowability and rubber elasticity of the composition. Examples of the filler include calcium carbonate, calcium silicate, talc, silica, mica, alumina, barium sulfate, aluminum sulfate, calcium sulfate, graphite, glass fibers, glass beads and carbon fibers. The filler may be added in an amount of not more than 50 wt. %, preferably 1–50 wt. % of the whole composition. It is also possible to add, as needed, various additives such as an antiblocking agent, lubricant, nucleating agent, ultraviolet light absorber, heat stabilizer, radiation-resisting agent, dye and pigment. The additive may be added in an amount of not more than 5 wt. %, preferably 0.001 ppm to 2 wt. %, of the whole composition.

The composition of the present invention can be prepared by melting and kneading its components in a Banbury mixer, a pressure kneader, a twin-screw extruder or the like. In the case of the twin-screw kneader, for example, all the materials can be mixed in a Henschel mixer at once and then molten and kneaded through an extruder. As an alternative, all the materials other than a crosslinking agent and a crosslinking aid are molten, kneaded and granulated and after the addition of the crosslinking agent and crosslinking aid, the resultant mixture is molten, kneaded and granulated again. The kneading temperature upon preparation is ordinarily 180°–250° C. The pellets so obtained can be formed by a conventional injection molding or extrusion process.

The thermoplastic elastomer according to the present invention has a small Young's modulus, which means excellent flexibility, a small tension set, which means excellent rubber elasticity and a low surface gloss, which provides a formed product with excellent and high-grade external appearance. When the thermoplastic elastomer according to the present invention is formed into a sheet or the like, the formed product has flexibility and soft touch like plasticized polyvinyl chloride and is therefore superior in touch to a product made from a composition consisting of isotactic polypropylene and ethylene-propylene(-diene) copolymer. Furthermore, a syndiotactic polypropylene has a stiffness lower than an isotactic polypropylene, which makes the rubber content of the former-propylene-containing composition smaller than the latter-propylene-containing composition to obtain the same stiffness. Such a smaller rubber content can minimize the reduction in chemical resistance, provides a formed product with a scratch-resistant surface and provides the thermoplastic elastomer with excellent fluidity.

In particular, owing to the relatively small rubber content compared with a soft material containing rubber in a large amount, the thermoplastic elastomer sheet according to the present invention has excellent vacuum formability and also pressure formability.

As has been described above, the thermoplastic elastomer according to the present invention is superior in flexibility, mechanical strength and rubbery properties, particularly tension set, to a thermoplastic elastomer prepared by melting and kneading a syndiotactic polypropylene, an ethylene-propylene-nonconjugated diene copolymer rubber and the like without adding any crosslinking agent and crosslinking aid. A sheet obtained from the thermoplastic elastomer of the present invention has a low surface gloss and excellent external appearance and touch and can be subjected to deep drawing so that it can be used preferably as an automotive trim material, for example. In addition, owing to release of no toxic gas even when incinerated after use, the composition according to this invention is extremely useful as a substitute for polyvinyl chloride resin which has posed a problem of environmental pollution upon its combustion.

EXAMPLES

The present invention will hereinafter be described more specifically by the following examples. It should however be borne in mind that this invention is by no means limited to or by the examples. Incidentally, the measurements in each example were conducted according to the following methods. Physical properties are shown in Tables 1 to 4.

(1) Melt flow index (MFI): ASTM D-1238 (measured at 230° C. under 2.16 kg load) was followed.

(2) Tensile strength at break and Young's modulus: JIS K6301 was followed using a No.1 dumbbell specified in the JIS.

(3) Tear strength: JIS K6301 (angle tear strength) was followed.

(4) Tension set: A No.1 dumbbell specified in the JIS was subjected to 100% elongation and held for 10 minutes. The permanent set upon an elapsed time of 10 minutes after removal of the load was measured.

(5) Gloss: ASTM D-523 was followed at an incidence angle of 60°.

(6) Shore hardness: ASTM D-2240 was followed.

(7) Gel fraction: The whole composition was boiled for 4 hours in boiling xylene, followed by filtration through a 400-mesh metal sieve at 125° C. The gel fraction was expressed in terms of the weight ratio of the residue to 100 parts by weight of the ethylene-propylene-nonconjugated diene copolymer rubber and/or ethylene-propylene copolymer rubber employed.

Examples 1–3

In each example, propylene was homopolymerized at 20° C. and a propylene pressure of 3.8 kg/cm² for 1.4 hours by employing 309 g of methyl aluminoxane (product of TOSO-AKZO CORPORATION, polymerization degree: 16.1) and 2.3 g of isopropylidene (cyclopentadienyl)(9-fluorenyl)zirconium dichloride which had been synthesized according to the process disclosed in Japanese Patent Laid-Open No. 41303/1990. The homopolymer so obtained was washed with methanol and hydrochloric acid and then dried, whereby 102.9 g of a syndiotactic homopolypropylene were obtained. The syndiotactic pentad fraction of the polypropylene as measured by $^{13}$C-NMR was 0.91, its intrinsic viscosity [η] in a tetralin solution at 135° C. 1.35 dl/g, and its molecular weight distribution (Mw/Mn) as measured by gel permeation chromatography (GPC) 2.4 (SPP-1). To the polypropylene, an ethylene-propylene-nonconjugated diene copolymer rubber, i.e., EPDM ("EP57P" trade name; product of Japan Synthetic Rubber Co., Ltd.; Mooney viscosity $ML_{1+4}$ at 100° C.: 88; iodine value: 15.0; propylene content: 28 wt. %; nonconjugated diene component: 5-ethylidene-2-norbornene), 2,5-dimethyl- 2,5-di(t-butylperoxy)hexane as a crosslinking agent, divinylbenzene as a crosslinking aid and a known stabilizer were added in accordance with the corresponding composition shown in Table 1 or 2. The resulting mixture was molten and kneaded in a pressure kneader (manufactured by Moriyama Mfg. Works Ltd.). At 190° C., the thus-kneaded thermoplastic elastomer was taken out, followed by press forming at 220° C., whereby a sheet of 1 mm in thickness was obtained.

Test results are shown in Table 1 and Table 2. The sheets obtained in Examples 1 and 2 were soft and had a low tension set and a low gloss. Thus, they had excellent physical properties as materials for automotive interior trim skins. The sheet obtained in Example 3 had a Shore "D" hardness of 45 and high tensile strength so that it had desirable physical properties as a material for automotive mud guards.

Example 4

Using the catalytic system described in Example 1, propylene and butene-1 were copolymerized at 21° C. and a propylene pressure of 3.8 kg/cm² for 1.5 hours. The copolymer so obtained was washed with methanol and hydrochloric acid and then dried, whereby 35.0 kg of a syndiotactic propylene-butene-1 random copolymer were obtained. The intrinsic viscosity [η] of the copolymer in a tetralin solution at 135° C. was 1.22 dl/g, its molecular weight distribution (Mw/Mn) as measured by GPC 2.1, its butene-1 content as measured by infrared spectrophotometry 10.5 wt. %, and its syndiotactic pentad fraction 0.74 (SPP-2). In a similar manner to Example 1 except that SPP-2 was used instead of SPP-1, a pressed sheet was obtained. Test results are shown in Table 3. The sheet obtained in Example 4 had a Shore "D" hardness of 40 so that it was desirable for automotive mud guards.

Example 5

In a similar manner to Example 1 except that to 35 wt. % of the polypropylene which had been polymerized in Example 1, 65 wt. % of an ethylene-propylene copolymer rubber, i.e., EPM ("EP07P", trade name; product of Nippon Synthetic Rubber Co., Ltd.; Mooney viscosity $ML_{1+4}$ at 100° C.: 70, propylene content: 27 wt. %) were added instead of the ethylene-propylene-nonconjugated diene copolymer rubber, a pressed sheet was obtained. Test results are shown in Table 4. The sheet obtained in Example 5 had good physical properties, however, that obtained using EPDM in Example 1 had a higher crosslinking density and was superior in tensile strength at break, tear strength and tension set.

Comparative Examples 1 and 2

In a similar manner to Example 1 and Example 3 except for the omission of the organic peroxide and the crosslinking aid, pressed sheets were obtained, respectively. Test results are shown in Table 1 and Table 2.

Comparative Examples 3

In a similar manner to Example 4 except for the omission of the organic peroxide and the crosslinking aid, a pressed sheet was obtained. Test results are shown in Table 3.

TABLE 1

|  | Unit | Example 1 | Example 2 | Comp. Ex. 1 |
| --- | --- | --- | --- | --- |
| Resin composition |  |  |  |  |
| SPP-1 | wt. % | 35 | 35 | 35 |
| SPP-2 | wt. % |  |  |  |
| EPDM* | wt. % | 65 | 65 | 65 |
| Organic peroxide | wt.part | 0.2 | 0.4 |  |
| Crosslinking aid | wt.part | 0.3 | 0.6 |  |
| Physical properties |  |  |  |  |
| Shore "A" hardness | degree | 70 | 53 | 77 |
| Tensile strength at break | kg/cm² | 139 | 91 | 114 |
| Young's modulus | kg/cm² | 227 | 204 | 325 |
| Tear strength | kg/cm | 80 | 58 | 71 |
| Tension set | % | 13 | 11 | 22 |
| Gloss | % | 0.7 | 0.5 | 10.1 |
| Gel fraction | wt. % | 85 | 94 | <1 |

*EPDM: Ethylene-propylene-nonconjugated diene copolymer rubber

TABLE 2

|  | Unit | Example 3 | Comp. Ex. 2 |
| --- | --- | --- | --- |
| Resin composition |  |  |  |
| SPP-1 | wt. % | 50 | 50 |
| EPDM* | wt. % | 50 | 50 |
| Organic peroxide | wt.part | 0.2 |  |
| Crosslinking aid | wt.part | 0.3 |  |
| Physical properties |  |  |  |
| Shore "D" hardness | degree | 45 | 51 |
| Tensile strength at break | kg/cm² | 160 | 132 |
| Young's modulus | kg/cm² | 690 | 980 |

TABLE 2-continued

|  | Unit | Example 3 | Comp. Ex. 2 |
|---|---|---|---|
| Tear strength | kg/cm | 105 | 100 |
| Tension set | % | 30 | 42 |
| Gloss | % | 7.6 | 48.7 |
| Gel fraction | wt. % | 79 | <1 |

*EPDM: ethylene-propylene-nonconjugated diene copolymer rubber

TABLE 3

|  | Unit | Example 4 | Comp. Ex. 3 |
|---|---|---|---|
| Resin composition |  |  |  |
| SPP-1 | wt. % |  |  |
| SPP-2 | wt. % | 50 | 50 |
| EPDM* | wt. % | 50 | 50 |
| Organic peroxide | wt.part | 0.2 |  |
| Crosslinking aid | wt.part | 0.3 |  |
| Physical properties |  |  |  |
| Shore "D" hardness | degree | 40 | 47 |
| Tensile strength at break | kg/cm² | 113 | 109 |
| Young's modulus | kg/cm² | 539 | 700 |
| Tear strength | kg/cm | 94 | 81 |
| Tension set | % | 22 | 35 |
| Gloss | % | 6.9 | 42.5 |
| Gel fraction | wt. % | 80 | <1 |

*EPDM: ethylene-propylene-nonconjugated diene copolymer rubber

TABLE 4

|  | Unit | Example 5 |
|---|---|---|
| Resin composition |  |  |
| SPP-1 | wt. % | 35 |
| SPP-2 | wt. % |  |
| EPM* | wt. % | 65 |
| Organic peroxide | wt.part | 0.2 |
| Crosslinking aid | wt.part | 0.3 |
| Physical properties |  |  |
| Shore "A" hardness | degree | 72 |
| Tensile strength at break | kg/cm² | 90 |
| Young's modulus | kg/cm² | 214 |
| Tear strength | kg/cm | 72 |
| Tension set | % | 16 |
| Gloss | % | 0.9 |
| Gel fraction | wt. % | 73 |

*EPM: Ethylene-propylene copolymer rubber

We claim:

1. A thermoplastic elastomer comprising (A) 10–90 wt. % of propylene homopolymer having a syndiotactic pentad fraction of at least 0.7, and/or propylene copolymer with olefin having a syndiotactic pentad fraction of at least 0.5 and (B) 90–10 wt. % of an ethylene-propylene-nonconjugated diene copolymer rubber and/or an ethylene-propylene copolymer rubber, said component (B) having been partially crosslinked.

2. A composition for preparing a thermoplastic elastomer, which comprises (A) 10–90 wt. % of propylene homopolymer having a syndiotactic pentad fraction of at least 0.7, and/or propylene copolymer with olefin having a syndiotactic pentad fraction of at least 0.5 and (B) 90–10 wt. % of an ethylene-propylene-nonconjugated diene copolymer rubber and/or an ethylene-propylene copolymer rubber, and an organic peroxide.

3. A composition of claim 2 for a preparing thermoplastic elastomer, wherein the organic peroxide is contained in an amount of 0.1–3.0 parts by weight per 100 parts by weight of the sum of the components (A) and (B).

4. A composition of claim 2 for a preparing thermoplastic elastomer, wherein the organic peroxide is 2,5-dimethyl-2,5-di-(t-butylperoxy)hexane.

5. A composition of claim 2 for preparing thermoplastic elastomer, which further comprises a crosslinking aid.

6. An automotive bumper fascia made of a thermoplastic elastomer, which comprises (A) 60–90 wt. % of polypropylene homopolymer having a syndiotactic pentad fraction of at least 0.7, and/or propylene copolymer with olefin having a syndiotactic pentad fraction of at least 0.5 having substantially a syndiotactic structure, and (B) 40–10 wt. % of an ethylene-propylene-nonconjugated diene copolymer rubber and/or ethylene-propylene copolymer rubber, said component (B) having been partially crosslinked.

7. An automotive mud guard made of a thermoplastic elastomer, which comprises (A) 40–60 wt. % of polypropylene homopolymer having a syndiotactic pentad fraction of at least 0.7, and/or propylene copolymer with olefin having a syndiotactic pentad fraction of at least 0.5 having substantially a syndiotactic structure, and (B) 60–40 wt. % of an ethylene-propylene-nonconjugated diene copolymer rubber and/or ethylene-propylene copolymer rubber, said component (B) having been partially crosslinked.

8. An automotive trim skin material made of a thermoplastic elastomer, which comprises (A) 10–50 wt. % of polypropylene homopolymer having a syndiotactic pentad fraction of at least 0.7, and/or propylene copolymer with olefin having a syndiotactic pentad fraction of at least 0.5 having substantially a syndiotactic structure, and (B) 90–50 wt. % of an ethylene-propylene-nonconjugated diene copolymer rubber and/or ethylene-propylene copolymer rubber, said component (B) having been partially crosslinked.

9. A process for the preparation of a thermoplastic elastomer, which comprises crosslinking a thermoplastic elastomer composition of claim 2 while melting and kneading the same.

* * * * *